June 24, 1958 J. F. SCULLY 2,840,705

SEQUENTIAL SELECTION MEANS

Filed Nov. 26, 1954 3 Sheets-Sheet 1

INVENTOR
JOHN F. SCULLY
BY William L. Glover
AGENT

June 24, 1958 J. F. SCULLY 2,840,705

SEQUENTIAL SELECTION MEANS

Filed Nov. 26, 1954 3 Sheets-Sheet 2

INVENTOR

JOHN F. SCULLY

BY William S. Glover

AGENT

June 24, 1958 J. F. SCULLY 2,840,705

SEQUENTIAL SELECTION MEANS

Filed Nov. 26, 1954 3 Sheets-Sheet 3

INVENTOR
JOHN F. SCULLY
BY William L. Glover
AGENT

United States Patent Office 2,840,705

Patented June 24, 1958

2,840,705

SEQUENTIAL SELECTION MEANS

John F. Scully, Glen Gardener, N. J., assignor to Monroe Calculating Machine Company, Orange, N. J., a corporation of Delaware Application November 26, 1954, Serial No. 471,370

10 Claims. (Cl. 250—27)

This invention relates to selection systems and more particularly to an improved sequential selection system.

Sequential selection systems are known which are capable of connecting one line with each of a plurality of other lines in a predetermined sequence, for example, stepping-switch circuits. The known systems operate in accordance with a fixed program which requires that all of the lines be scanned during each cycle of operations. In many types of equipment, the frequency at which the lines are scanned and the frequency at which the lines become active and require scanning are independent and asynchronous. This condition is responsible for needless scanning of inactive lines and results in an unwarranted extension of the average period for which an active line must wait to be scanned. The duration of each cycle of operations is directly proportional to the total number of lines which can be scanned, not to the number which are scanned effectively. Where each of a large number of lines may require only an occasional scanning, the efficiency of the known selection systems is extremely poor.

The principal object of the invention, therefore, is the provision of a sequential selection system which operates in accordance with a variable program which enables it to scan only those lines which require scanning, the duration of each cycle of operations of the system thus being directly proportional to the number of lines which require scanning and are scanned during the cycle.

Figure 1:
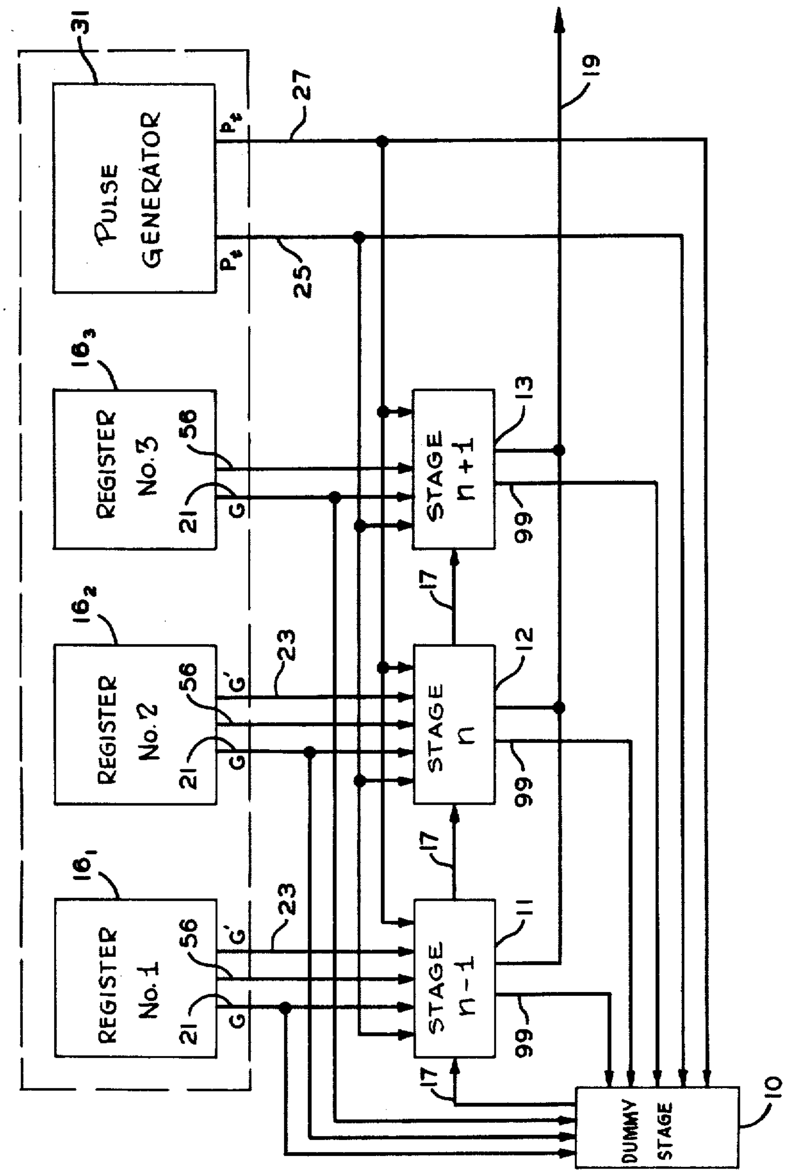
Figure 2:
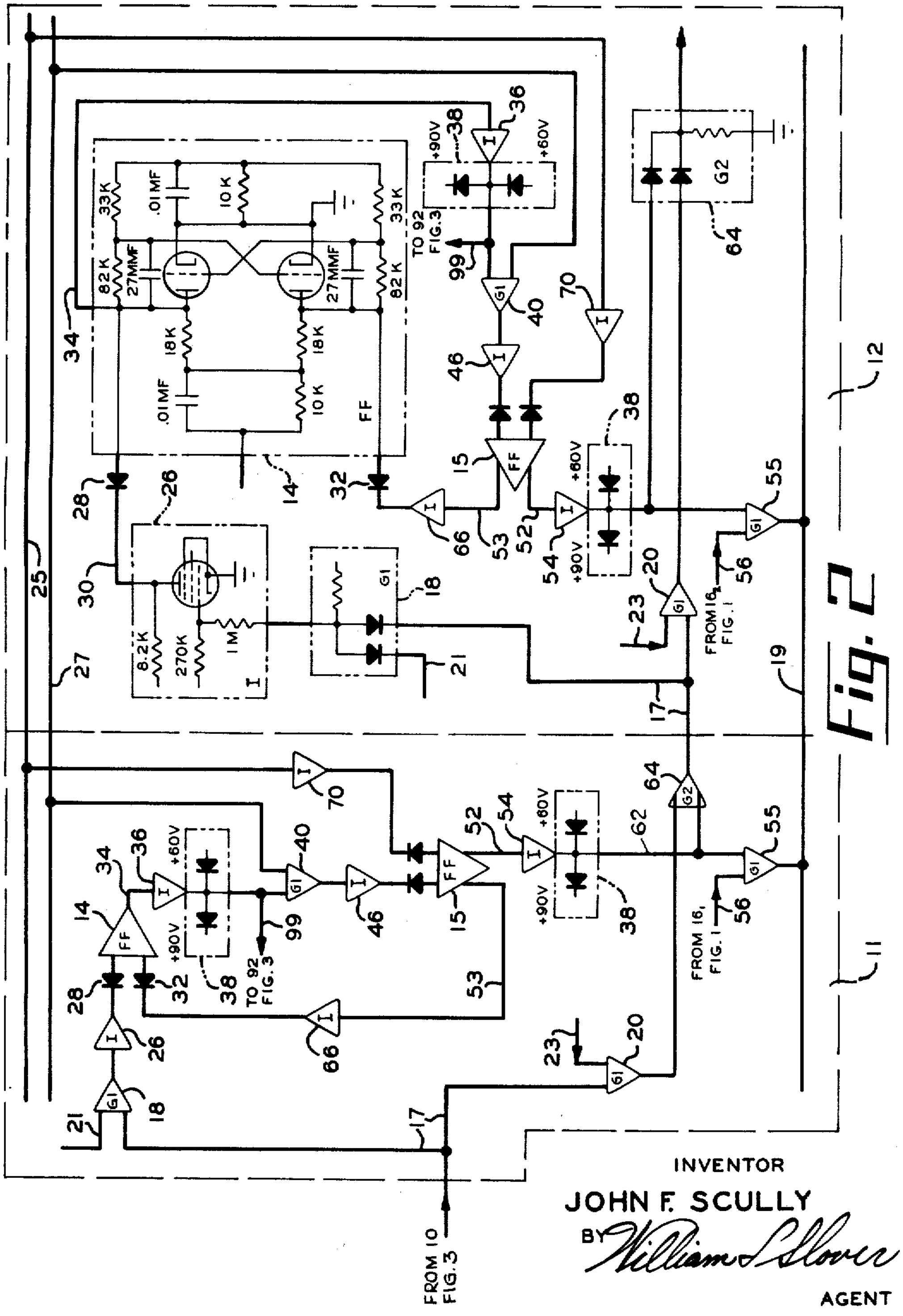
Figure 3:
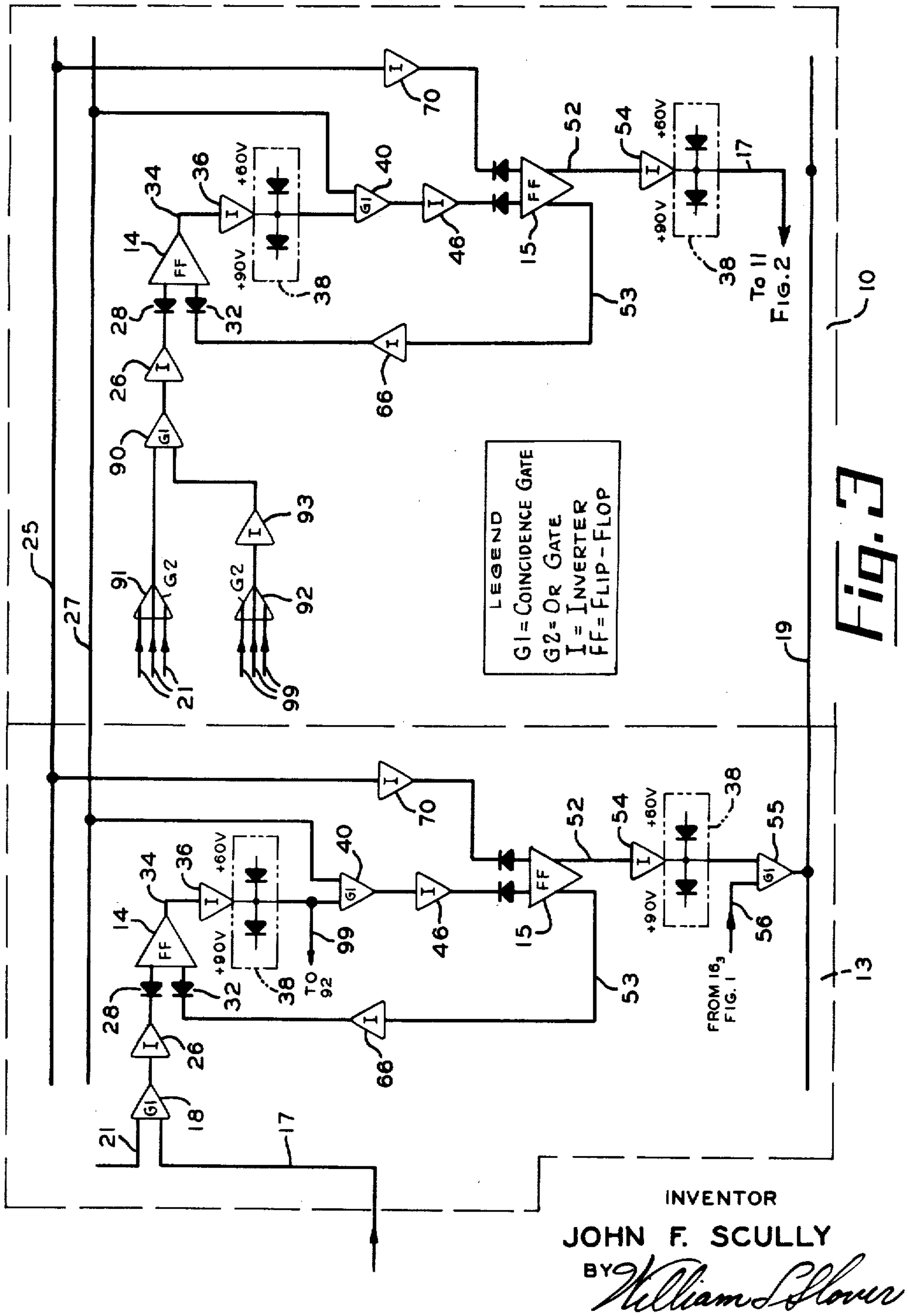

Other objects and features of the invention will become apparent from the following description when read in the light of the attached drawings of which:

Fig. 1 is a block diagram of an exemplary embodiment of the selection circuit of the invention, and Figs. 2 and 3 taken together, comprise a more detailed wiring diagram of the circuit of Fig. 1.

The selection means of the invention is arranged in stages or columns, one for each of the plurality of lines which are to be connected with a common line selectively. Additionally, a "dummy" or primer column is provided to prevent "stalling" of the system when none of the said plurality of lines requires scanning during a cycle of operations, as will be described more fully hereinafter.

Referring to Figs. 1, 2 and 3 the dummy stage or column 10 and the $n-1$, $n$ and $n+1$ columns, 11, 12 and 13, respectively, of an $n+1$-column selection circuit are disclosed. The $n$th column 12 is shown in somewhat more detail than columns 11 and 13 with which it is identical, and the description will be centered around its operation. First, however, it is deemed desirable to point out that columns 11, 12 and 13 serve to connect units $16_1$, $16_2$ and $16_3$ with a common line 19 selectively. According to the invention the units $16_1$, $16_2$ and $16_3$ may comprise any devices requiring periodic connection to a common line. The several units need not require connection to the common line at the same frequency, nor must the frequency of each be constant. By way of example, the units $16_1$, $16_2$ and $16_3$ may comprise data storage registers into which data of one sort or another is transmitted at variable rates, later to be disgorged from the registers onto the common line. The units $16_1$, $16_2$ and $16_3$ need not be related except in that they must exert a control over the differential operations of the selection circuit of the invention in a manner to be described.

In order for the means of the invention to distinguish between those units which require connection to the common line and those which do not, an indication of its condition is demanded of each unit. In the illustrated instance of the invention this indication is in the form of alternative signals "G" and "G′" of which the former designates a need for connection to the common line and the latter designates a lack of such need. The signals "G" and "G′" may be transmitted to the means of the invention over lines 21 and 23. Also, the rate of advance of the means of the invention, that is, the period for which each unit is connected to the common line may be placed under control of the units 16 or under control of timing control means associated therewith. In the illustrated instance of the invention this control is exerted through the medium of pulses "$P_t$" and pulses "$p_t$" of which the latter may be slightly delayed images of the former. The pulses "$P_t$" and "$p_t$" may be transmitted to the means of the invention over conductors 25 and 27.

The means for producing the signals "G" and "G′" and the pulses "$P_t$" and "$p_t$" form no part of the present invention and need not be illustrated or described. However, it is deemed worthwhile to point out that the signals "G" and "G′" may comprise the dual outputs of a flip-flop which is set to one state whenever it is desired to connect the associated unit with the common line, and to the opposite state when the opposite condition prevails. Also the pulses "$P_t$" and "$p_t$" may be entirely independent of the signals "G" and "G′" and may stem from a common source (the latter, "$p_t$" through a delay circuit) such, for example, as a switching circuit controlled by the units and by the timing control means of the system embodying the units and adapted to produce the pulses as times appropriate to the units currently connected to the common line. For convenience of illustration the "$P_t$" and "$p_t$" pulses are shown as stemming from a common pulse-generating means 31 (Fig. 1).

In the illustrated instance of the invention logical voltage levels of +60 and +90 volts are used throughout. Thus, the "G" and "G′" signals and the "$P_t$" and "$p_t$" pulses appear as rises in potential of the lines carrying the same, from the +60-volt level to the +90-volt level.

Referring now to Fig. 2, an operation of the $n$th column 12 of the means of the invention is initiated by a signal "$I_n$" transmitted thereto from the $n-1$ column over a line 17. The signal "$I_n$" is applied to a pair of coincidence gates 18 and 20 which are alternatively conditioned to pass the signal by the signals "G" and "G′" from the associated unit 16. Assuming for the moment that the signal "G′" is present the signal "$I_n$" is passed by coincidence gate 20 and is applied to an 'Or" gate 64 which produces an output signal "$I_{n+1}$" for application to the coincidence gates 18 and 20 of the $n+1$ column of the means of the invention. Thus, column $n$ is bypassed without delay. However, when the signal "G" is present the gate 18 passes the "$I_n$" signal to an inverter 26. The output line 30 of the inverter is applied to a flip-flop 14 through an isolating diode 28 to set the flip-flop to one of its stable states, hereinafter referred to as the "set" state. As shown, the flip-flop may be of conventional design and is provided with an output line 34 which assumes a low potential (+60 volts) when the flip-flop is in the set state. Line 34 is applied to an inverter 36 whch controls a coincidence gate 40 along with the "$p_t$" pulses appearing on line 27. Preferably the output line of the inverter 36 is restricted to the +60- and +90-volt levels by a typical clamping circuit 38. The arrangement is such that when the flip-flop 14 is set, the inverter 36 applies a high potential to coincidence gate 40 which, however, does not pass the same until the occurrence of the next following "$p_t$" pulse on line 27. The output of coincidence gate 40 is applied to an inverter 46 which serves to pull a flip-flop 15, identical to the flip-flop 14, to its set state. Flip-flop 15 is provided with two output lines 52 and 53 of which the former assumes a low potential when the flip-flop is set and the latter assumes a high potential under the same condition. The output line 53 of the flip-flop is applied to an inverter 66 which conducts on setting of the flip-flop and applies a low potential to flip-flop 14 through an isolating diode 32 to reset the flip-flop. If desired, a delay circuit such, for example, as an integrator may be interposed betwen inverter 66 and flip-flop 14 to delay resetting of the latter until flip-flop 15 has achieved a fully set state. The output line 52 of the flip-flop 15 is applied to an inverter 54 which is cut off on setting of the flip-flop and produces a high (+90-volt) output. The output of inverter 54 is utilized to control whatever device is provided to connect the related unit 16 to the common line 19. In the illustrated instance of the invention, the output of the inverter is applied to a coincidence gate 55 along with a signal output line 56 of the associated unit (see also Fig. 1). The output of coincidence gate 55 is applied to the common line 19.

It will be seen, therefore, that on setting of the flip-flop 15 under control of a "$p_t$" pulse and the signal "$I_n$" the coincidence gate 55 is conditioned to pass signals emanating from the related unit 16 to the common line 19.

The output of the inverter 54 is also applied via a line 62 to the "Or" gate 64 mentioned above, which produces an "$I_{n+1}$" signal to initiate operation of the $n+1$ stage of the means of the invention. Therefore, a signal "$I_{n+1}$" is produced on setting of the *n*th stage flip-flop 15 under control of the first "$p_t$" pulse which occurs following application of the signal "$I_n$" to the stage.

The flip-flop 15 is reset to its normal condition by an inverter 70 on the occurrence of the "$P_t$" pulse next following the "$p_t$" pulse which effected setting of the flip-flop, the line 25 carrying said "$P_t$" pulses being connected to the inverter.

Thus, the path to the common line 19 which is under control of the *n*th stage of the selection circuit, namely, gate 55, is held open (by flip-flop 15 and inverter 54) for an interval of time which begins on the occurrence of a "$p_t$" pulse (one coinciding with an "$I_n$" signal) and ends on the occurrence of the next following "$P_t$" pulse. This time interval may conveniently be termed a selection interval. Obviously the duration of this selection interval is fixed by the frequency of the "$P_t$" and "$p_t$" pulses and the span between the former and the latter, which variables are adjusted to complement the needs of the system embodying the units 16, that is, to provide a time interval which is sufficiently long to permit of a desired amount of data being transferred from a said unit to the common line.

It will be noted that whereas the signal "$I_{n+1}$" is transmitted from the *n*th stage of the selection circuit to the $n+1$ stage at the beginning of the *n*th stage's selection interval, this interval is terminated by a "$P_t$" pulse before the selection interval for stage $n+1$ is initiated by the next following "$p_t$" pulse. Thus, no more than one unit 16 at a time is ever connected to the common line.

It is apparent, therefore, that the conductors 17 which carry the initiating signals "I" are connected in a series path which includes, in each column, either the direct, delayless connection through gate 20 or a delay-producing detour through the gate 18. Whenever none of the columns of the selection circuit is conditioned for operation by a signal "G," an initiating signal traverses the said series path without delay, and without regeneration. Thus, if it is desired to connect the end of the path (that is, the gate 64 in the last column) back to its beginning to form an endless loop, it is necessary to include a regenerator in the loop. This may take the form of a pair of serially connected amplifier-inverters of the type described above or any other suitable means. Preferably, however, in order to obtain other operational features to be described, the dummy column 10 or its equivalent is interposed between the last selection column and the first.

Referring to Figs. 1 and 3 the dummy column 10 of the means of the invention comprises a pair of flip-flops 14 and 15 identical with the flip-flops of the other columns. The flip-flop 14 of the dummy column, however, instead of being set under control of "I" signals, is set under control of a coincidence gate 90 controlled jointly by a pair of "Or" gates 91 and 92. "Or" gate 91 is controlled by the "G" signals appearing on the lines 21 from the several units 16 and produces a high output whenever any "G" signal is present. The "Or" gate 92 is controlled by the outputs of the inverters 36 in the several columns on the selection circuit via conductors 99. This inverter, it will be remembered, is the one which is cut off on setting of the related flip-flop 14. Therefore, "Or" gate 92 produces a high output whenever any flip-flop 14 is in the set state. The output of "Or" gate 92 is not applied directly to coincidence gate 90 but rather to an inverter 93 which applies a high potential to the coincidence gate only when none of the flip-flops 14 are in the set state. Obviously gate 90 produces a high output only when one or more of the "G" signals is present and none of the flip-flops 14 are set. This high potential effects setting of the dummy column flip-flop 14 and on the occurrence of the next following "$p_t$" pulse, flip-flop 15 of the dummy column is set and cuts off the associated inverter 54 to apply a signal "$I_1$" to the first stage of the selection circuit, in the illustrated instance, stage $n-1$. As described hereinabove the dummy column flip-flop 14 is reset by an inverter 66 on setting of the related flip-flop 15; and the latter is reset by inverter 70 on the occurrence of the first "$P_t$" pulse following the setting.

The arrangement is such that the dummy column operates to produce a signal "$I_1$" wherever a signal "G" occurs in any column while the flip-flops 14 in all of the selection columns are in the reset state. Thus, when a cycle of operations of the selection means has been completed, that is, when the last stage of the selection chain having a signal "G" applied thereto has operated, the dummy column will not initiate another cycle of operations until a "G" signal occurs in some column and creates a need for such operation. If a "G" signal is present on completion of a cycle of operations, the dummy column operates immediately. It will be noted in Fig. 3 that gates 20 and 64 are not provided in the $n+1$ stage as the dummy column eliminates the need for a signal "I" from this stage. It is to be mentioned that the resistor values of the coincidence and "Or" gates utilized in the means of the invention are varied from one gate to another where the gates are directly coupled to one another to preserve the logical voltage levels. This technique is so well known, however, that it is not illustrated.

While there has been above described but a single embodiment of the invention, many changes therefor and additions thereto can be made without departing from the spirit of the invention and it is not desired, therefore, to limit the scope of the invention except as pointed out in the appended claims or as dictated by the prior arts.

I claim:

1. In a sequential selection circuit for connecting a plurality of devices with a common line selectively, each device producing a signal when such connection is desired, the combination in each of a plurality of stages of means for connecting a said device with the line, a first flip-flop set to one state to enable said means, a second flip-flop, timed means controlled by the second flip-flop to set the first flip-flop to said one state, timed means to reset the first flip-flop, means jointly controlled by: the signal from said device, and by a preceding stage first flip-flop set to said one state, to effect setting of the second flip-flop, and means actuated by the instant stage first flip-flop on setting thereof to reset the second flip-flop.

2. The combination according to claim 1 wherein each stage also includes means for conveying a representation of the set-state of the first flip-flop in a preceding stage, to the next following stage.

3. The combination with a plurality of devices to be connected with a common line, each device being productive of a signal when it is ready for connection with the line, and timing pulse producing means; of a selection circuit having a stage for each said device, each stage comprising means for connecting the device with the line, a first flip-flop set to one state to enable said connecting means, a second flip-flop, means controlled by the second flip-flop and the timing pulse producing means to set the first flip-flop to said one state, means controlled by the timing pulse producer to reset the first flip-flop after it has been set in said one state for a predetermined period of time, and means controlled by the ready signal and by the first flip-flop in a preceding stage to set the second flip-flop to effect timed setting of the first flip-flop.

4. The combination with a plurality of devices to be connected with a common line, each device being productive of a signal when it is ready for connection with the line, and timing pulse producing means; of a selection circuit having a stage for each said device, each stage comprising means for connecting the device with the line, a first flip-flop set to one state to enable said connecting means, a second flip-flop, means controlled by the second flip-flop and the timing pulse producing means to set the first flip-flop to said one state, means controlled by the timing pulse producer to reset the first flip-flop after it has been set in said one state for a predetermined period of time, means controlled by the ready signal and by a first flip-flop set to said one state in a preceding stage to set the second flip-flop to effect timed setting of the first flip-flop, and means actuated by the first flip-flop on setting thereof to reset the second flip-flop.

5. The combination according to claim 4 wherein each stage also includes means for conveying a representation of the set-stage of the first flip-flop in a preceding stage, to the next following stage.

6. The combination according to claim 4 wherein each stage also includes means controlled by the first flip-flop of the stage and by the first flip-flop in the preceding stage and capable of effecting setting of the second flip-flop of the succeeding stage on setting of the first flip-flop in any stage preceding said succeeding stage.

7. The combination according to claim 6 wherein the means for effecting setting of the second flip-flops of the several stages provide a series path bypassing the first and second flip-flops of a stage not enabled by a ready signal, the effect of setting a first flip-flop being to inject a signal into the path, and including other means for injecting a signal into the path periodically to initiate operation of any stages enabled by ready signals.

8. The combination according to claim 7 wherein the said other means comprises a dummy stage provided with a third flip-flop settable to one state to inject a signal into said path, a fourth flip-flop, means controlled by the fourth flip-flop and the timing pulse producing means for setting the third flip-flop to said one state, and means for setting the fourth flip-flop to effect setting of the third, on occurrence of a ready signal in any stage while all of the second flip-flops are in the reset state.

9. The combination according to claim 8 and including means controlled by the third flip-flop to reset the fourth flip-flop on setting of the former, and means controlled by the timing pulse producing means for resetting the third flip-flop a predetermined length of time after it has been set.

10. The combination according to claim 9 wherein the means for setting the fourth flip-flop, comprise a first circuit productive of a signal on the occurrence of any ready signal, a second circuit productive of a signal when all of the second flip-flops are in the reset state, and coincidence means controlled by said signals.

References Cited in the file of this patent

UNITED STATES PATENTS

| | | |
|---|---|---|
| 2,462,111 | Levy | Feb. 22, 1949 |
| 2,541,932 | Melhouse | Feb. 13, 1951 |
| 2,570,716 | Rochester | Oct. 9, 1951 |
| 2,594,731 | Connolly | Apr. 29, 1952 |